(12) United States Patent
Hoffmann et al.

(10) Patent No.: US 10,734,863 B2
(45) Date of Patent: Aug. 4, 2020

(54) FASTENING ARRANGEMENT OF AN ELECTRIC MOTOR AND SEAT

(71) Applicant: Adient Luxembourg Holding S.à r.l., Luxembourg (LU)

(72) Inventors: Andreas Hoffmann, Wülfrath (DE); Stefanie Kretschmann, Wuppertal (DE); Tamas Poczik, Köln (DE); Thorsten Schürmann, Odenthal (DE)

(73) Assignee: Adient Luxembourg Holding S.á r.l., Luxembourg (LU)

( * ) Notice: Subject to any disclaimer, the term of this patent is extended or adjusted under 35 U.S.C. 154(b) by 54 days.

(21) Appl. No.: 16/315,382

(22) PCT Filed: Jul. 5, 2017

(86) PCT No.: PCT/EP2017/066766
§ 371 (c)(1),
(2) Date: Jan. 4, 2019

(87) PCT Pub. No.: WO2018/007440
PCT Pub. Date: Jan. 11, 2018

(65) Prior Publication Data
US 2019/0260263 A1 Aug. 22, 2019

(30) Foreign Application Priority Data

Jul. 5, 2016 (DE) .......................... 10 2016 212 257
Aug. 19, 2016 (DE) .......................... 10 2016 215 571

(51) Int. Cl.
*H02K 5/00* (2006.01)
*H02K 5/26* (2006.01)
(Continued)

(52) U.S. Cl.
CPC ............. *H02K 5/26* (2013.01); *B60N 2/0232* (2013.01); *B60N 2/067* (2013.01); *B60N 2002/024* (2013.01)

(58) Field of Classification Search
CPC .......... H02K 5/04; H02K 5/26; B60N 2/0232; B60N 2/067; B60N 2002/024
(Continued)

(56) References Cited

U.S. PATENT DOCUMENTS 2,885,142 A   5/1959  Eberhart
3,395,594 A * 8/1968  Balair ................... F16H 57/025
                                                            74/606 R
(Continued)

FOREIGN PATENT DOCUMENTS

CN      202395629 U    8/2012
CN      104802667 A    7/2015
(Continued)

OTHER PUBLICATIONS

State Intellectual Property Office of People's Republic of China. The First Office Action in Application No. CN 201780041820.7, dated Apr. 1, 2020, 15 pages.

*Primary Examiner* — Thanh Lam
(74) *Attorney, Agent, or Firm* — Marshall & Melhorn, LLC

(57) ABSTRACT

A fastening arrangement (B'), for fastening of an electric motor (2) to a seat (S), includes a motor retaining element (F1, F2) and a motor locking element (A). The motor retaining element (F1, F2) is configured such that the electric motor (2) is adjustable into a rotational position (D). The motor locking element (A) is configured such that the electric motor (2) can be locked in a set rotational position (D). The motor locking element (A) is configured such that the electric motor (2) is retained so as to be non-displaceable in an axial direction and is secured against rotation by a (Continued)

torque lock. The motor locking element (A) has a polygonal profile (P). The outer profile of the motor locking element (A) has multiple surfaces distributed uniformly over the circumference, which surfaces form the shape of a polygon.

13 Claims, 8 Drawing Sheets

(51) Int. Cl.
*B60N 2/02* (2006.01)
*B60N 2/06* (2006.01)

(58) Field of Classification Search
USPC ........................................ 310/89–91; 297/362
See application file for complete search history.

(56) References Cited

U.S. PATENT DOCUMENTS

| | | | |
|---|---|---|---|
| 3,983,429 A | 9/1976 | Allardice, Jr. | |
| 5,488,259 A * | 1/1996 | Cho | F16M 5/00 |
| | | | 310/425 |
| 8,540,203 B2 * | 9/2013 | Ruess | B60N 2/067 |
| | | | 248/421 |
| 9,623,768 B2 * | 4/2017 | Landskron | B60N 2/067 |
| 2001/0048058 A1 | 12/2001 | Folliot et al. | |
| 2013/0015313 A1 | 1/2013 | Schmid et al. | |
| 2019/0275914 A1 * | 9/2019 | Schuermann | F16H 25/20 |

FOREIGN PATENT DOCUMENTS

| | | |
|---|---|---|
| DE | 88 08 854 U1 | 12/1989 |
| DE | 20 2008 005 744 U1 | 9/2009 |
| FR | 2 883 810 A1 | 10/2006 |
| GB | 2 033 672 A | 5/1980 |

* cited by examiner

FASTENING ARRANGEMENT OF AN ELECTRIC MOTOR AND SEAT

CROSS REFERENCE TO RELATED APPLICATIONS

This application is a United States National Phase Application of International Application PCT/EP2017/066766, filed Jul. 5, 2017, and claims the benefit of priority under 35 U.S.C. § 119 of German Applications 10 2016 212 257.6, filed Jul. 5, 2016 and 10 2016 215 571.7, filed Aug. 19, 2016, the entire contents of which are incorporated herein by reference.

TECHNICAL FIELD

The invention concerns a fastening arrangement of an electric motor, in particular for fastening the electric motor to a seat. The invention furthermore concerns a seat with a fastening arrangement.

BACKGROUND

Seats, in particular vehicle seats, can be adjusted in length, height and tilt. A position of the seat may be adjusted manually, for example by means of a lever and/or a handle, or electrically by means of an electric motor which can be actuated by a control element. The electric motor may be attached to the seat by means of a specific fastening arrangement. For example, the fastening arrangement for fixing the electric motor comprises fastening tabs on the electric motor which correspond to fastening pins on the seat.

DE 20 2008 005 744 U1 discloses an electric motor and a brush carrier. The brush carrier has six substantially tubular screw openings.

SUMMARY OF THE INVENTION

The invention is based on the object of providing a fastening arrangement of an electric motor, in particular for fastening the electric motor to a seat, which is improved in comparison with the prior art, and an improved seat with a fastening arrangement.

A fastening arrangement according to the invention for an electric motor, in particular for fastening the electric motor to a seat, comprises at least one motor fixing element and at least one motor locking element, which are each arranged on the electric motor. The at least one motor fixing element is configured such that the electric motor can be set in a rotational position, in particular it can be pre-positioned or pre-fastened. The at least one motor locking element is configured such that the electric motor can be locked in a set rotational position.

By means of the fastening arrangement configured in this manner, a flexible arrangement of the electric motor relative to the seat is possible, whereby at the same time, a torque lock is achieved which requires little installation space. Because the electric motor can be fastened in various rotational positions relative to the seat, a position of an electrical connection of the electric motor may be selected flexibly in the installation space of the seat. This allows the use of electric motors with a largely uniform position of the electrical connection on the periphery of the electric motor.

According to one exemplary embodiment, the at least one motor fixing element and the motor locking element are arranged on an end face of the electric motor.

Preferably, the at least one motor fixing element and the motor locking element are arranged coaxially to each other. In particular, the motor fixing element and the motor locking element are arranged coaxially to a motor axis of the electric motor, wherein the motor fixing element is outwardly surrounded by the motor locking element in the radial direction and arranged coaxially thereto.

Furthermore, the motor locking element and the at least one motor fixing element are preferably arranged so as to be axially offset to each other. In particular, the motor fixing element extends outwardly in the axial direction starting from the motor locking element. The motor fixing element thus allows a push-fit connection of the electric motor, and the motor locking element allows a torque lock of the electric motor.

In addition, the motor locking element is preferably configured such that the electric motor is fastened so as to be immovable in the axial direction and can be secured against twisting by means of a torque lock.

The outer profile of the motor locking element according to the invention has multiple surfaces which are distributed uniformly over the periphery and form the shape of a polygon, and thus form a torque lock.

Furthermore, the motor fixing element is preferably configured such that the electric motor is fastened so as to be immovable in the axial direction and can be adjusted into one of several rotational positions, in particular in steps.

According to an exemplary embodiment, the at least one motor locking element is configured as a protrusion which is arranged on the end face of the electric motor and protrudes axially from an end shield of an electric motor housing. The motor locking element may be formed integrally with the end shield. Alternatively, the motor locking element may also be formed as a separate component which is connected to the end shield, e.g. by substance bonding. The end shield forms an end face of the electric motor housing and should thus be regarded as a type of housing cover, wherein the end shield is either a separate component or is formed integrally with the electric motor housing, for example by means of deep drawing. Usually, the electric motor housing has two end shields so that the electric motor housing has an end shield on each end face.

According to the invention, the motor locking element has a polygonal profile and may be connected to the corresponding locking component on the seat. In particular, the polygonal profile has at least four function surfaces, ideally six or more function surfaces, so that the polygonal profile may be formed for example as an external hexagonal profile, octagonal profile or decagonal profile. By means of the polygonal profile, several rotational positions of the electric motor, and hence of an electrical connection of the electric motor, are possible relative to the seat, wherein a rotational stepping of the rotational position of the electrical connection in the installation position of the electric motor amounts preferably to a maximum of 60°. In other words, in the concrete case of a hexagonal profile of the motor locking element, the electric motor and hence the electrical connection may be arranged in six different rotational positions relative to the seat, wherein the rotational positions are each offset to each other by an angle of 60° relative to a rotation axis of the electric motor.

For example, the corresponding locking component is formed as a recess in the seat which has a polygonal profile, in particular as an inner polygonal profile, corresponding to the polygonal profile of the at least one motor locking element. In this way, the motor locking element may be arranged in the locking component by form fit, in particular with a precise fit, so as to lock because of the polygonal profile. It is then no longer possible to rotate the electric motor housing, so that a torque lock of the electric motor can be achieved without additional fastening elements.

According to a further exemplary embodiment, two motor fixing elements are provided, by means of which the electric motor may be fastened to the seat.

For example, the electric motor may be fastened to the seat by means of a motor fixing element arranged on an output side of the electric motor, via a form-fit and friction-fit connection, in particular via a clamp connection. The corresponding fixing component for this for example has a clamp opening.

By means of the other motor fixing element arranged on another output side of the electric motor, the electric motor may be fastened to the seat via a form-fit connection. For example, for this the seat comprises a corresponding recess in which the motor fixing element may be arranged by form fit. The motor locking element and the motor fixing element are thus arranged on a common end face of the electric motor but on different sectional planes through a rotation axis of the electric motor.

According to an exemplary embodiment, the motor fixing elements are each formed by a bearing journal of the electric motor which protrudes radially outwardly and is guided through an end shield, wherein the bearing journals are each arranged coaxially to the rotation axis of the electric motor.

The invention furthermore concerns a seat with a fastening arrangement. Here, the fastening arrangement comprises at least one fixing component corresponding to the motor fixing element, and at least one locking component corresponding to the motor locking element, wherein the fixing component and the locking component are each arranged on the seat, and wherein by means of the at least one motor locking element and the at least one corresponding locking component, the electric motor may be arranged flexibly relative to the seat with regard to a rotational position of the electric motor, and may be locked in the set rotational position.

According to an exemplary embodiment, by means of a motor fixing element arranged on an output side of the electric motor, the electric motor may be fixed to the seat via a form-fit or friction-fit connection.

Furthermore, the electric motor may also be fixed to the seat via a form-fit connection by means of a motor fixing element arranged on another output side of the electric motor.

The fastening arrangement is particularly suitable for a length adjustment unit of a seat, wherein according to one exemplary embodiment, the at least one fixing component and the at least one locking component are arranged on a carrier element of a length adjustment unit of the seat.

Exemplary embodiments of the invention are explained in more detail with reference to drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
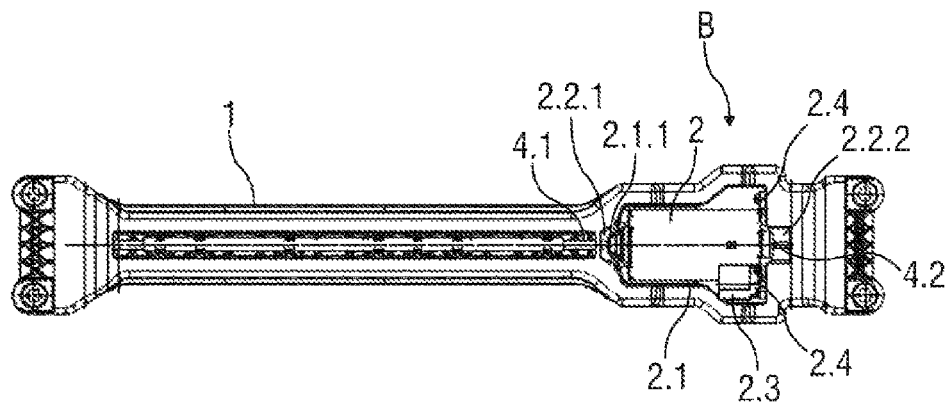
FIG. 1 is a diagrammatic top view of a carrier element of a length adjustment unit of a seat with an electric motor in connected state according to the prior art.
Figure 2:
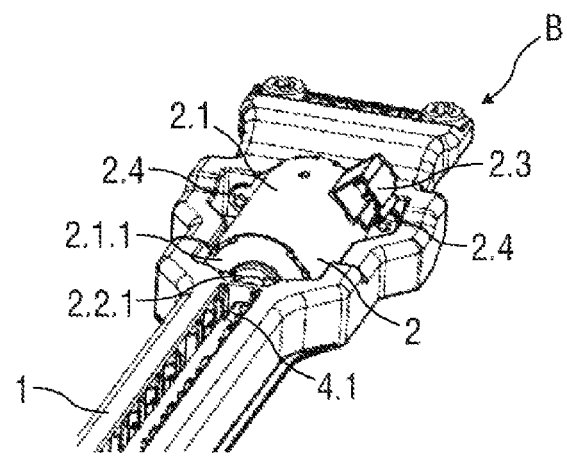
FIG. 2 is a diagrammatic perspective view of an extract with the carrier element and electric motor in connected state according to the prior art.
Figure 3:
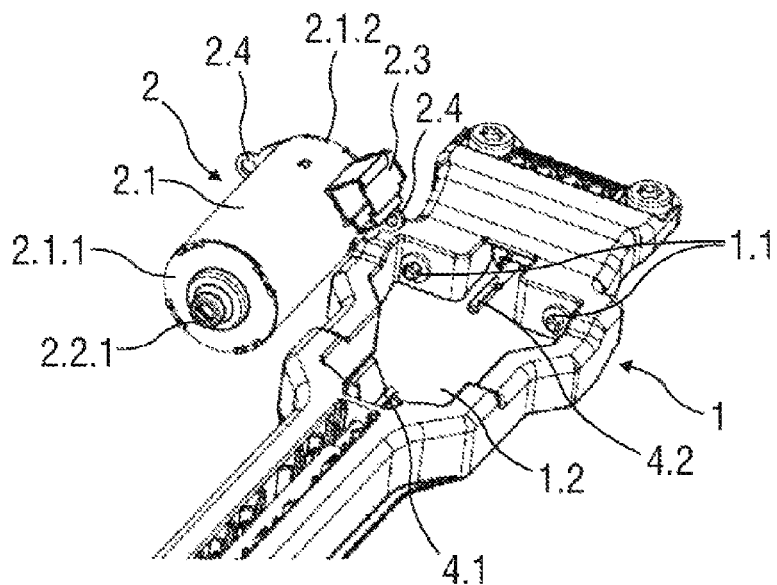
FIG. 3 is a diagrammatic perspective view of an extract with the carrier element and electric motor according to FIGS. 1 and 2 in unconnected state.
Figure 15:
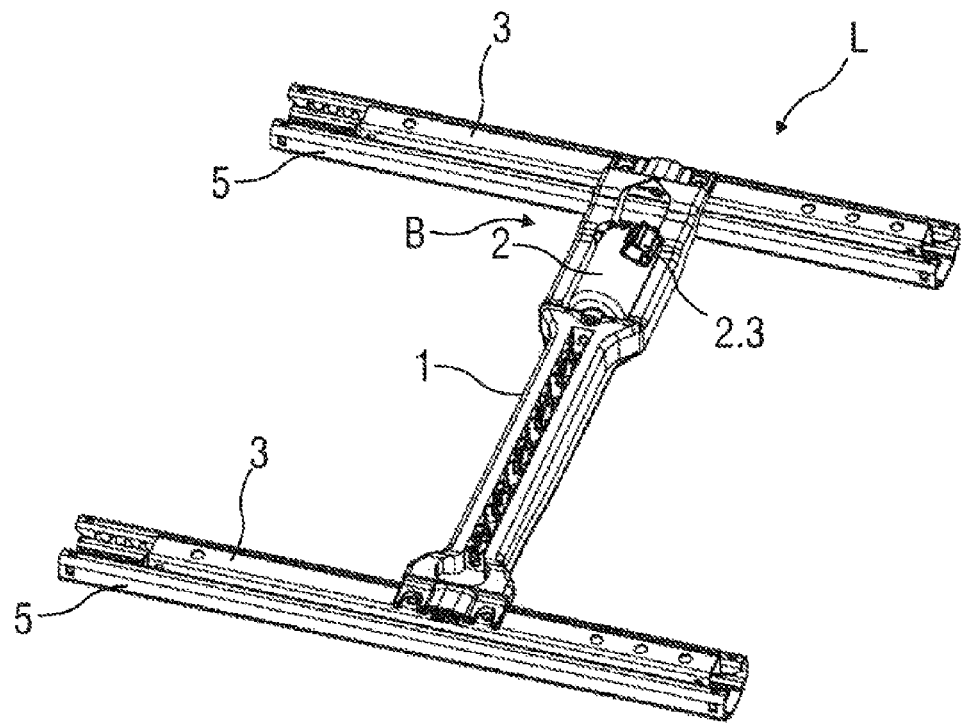
FIG. 15 is a diagrammatic perspective view of a length adjustment unit with the carrier element, electric motor and an upper rail of a seat.
Figure 16:
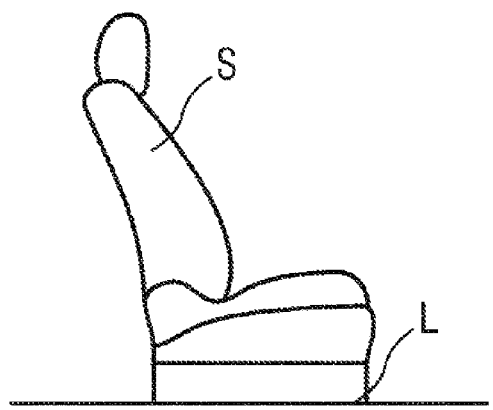
FIG. 16 is a diagrammatic seat with a length adjustment unit.

Referring to the drawings, FIG. 1 shows in top view a carrier element 1 of a length adjustment unit L (see FIG. 15) of a seat S shown in FIG. 16, for example a vehicle seat, with an electric motor 2 and a fastening arrangement B for the electric motor 2 according to the prior art. FIG. 2 shows in perspective an extract with the carrier element 1 and the electric motor 2, and the fastening arrangement B according to the prior art. FIG. 3 shows in perspective an extract with the carrier element 1 and the electric motor 2 according to FIGS. 1 and 2 in the unconnected state.

The carrier element 1 is made for example from plastic, and is connected to a seat part, in particular an upper rail 3 connected to the seat part (see FIG. 15), by means of which the seat part may be displaced longitudinally along a lower rail 5 attached to a vehicle floor (see FIG. 15).

To execute the longitudinal movement, for example an electric motor 2 is assigned to both upper rails 3 of the seat S, and drives the upper rails 3 such that they are longitudinally movable relative to the lower rail 5. To transmit the motorized drive movements of the electric motor 2 to the upper rails 3, gear mechanisms may be provided in the known fashion. FIGS. 1 to 3 show as an example two shafts 4.1, 4.2 which are connected to the electric motor 2 and to a spindle (not shown in detail), wherein the spindles are connected to the upper rails 3. In other words, the electric motor 2 transmits a torque via rotatable shafts 4.1, 4.2 to the gear units (not shown in detail) arranged in the upper rails 3. Said gear units then convert the torque via spindles into a movement in a rail longitudinal direction.

The electric motor 2 is for example a DC motor and comprises a rotatably mounted motor (not shown in detail) which rotates about a motor axis M. The rotor is surrounded by a stator (also not shown). The rotor and the stator are arranged in a common electric motor housing 2.1. A respective end face of the electric motor housing 2.1 is formed by an end shield 2.1.1, 2.1.2 in the form of a housing cover, wherein the end shields 2.1.1, 2.1.2 may each be separate components which are connected to the electric motor housing 2.1. Alternatively, one of the end shields 2.1.1, 2.1.2 may also be integrally connected to the electric motor housing 2.1, for example by means of deep drawing. Furthermore, a bearing journal 2.2.1, 2.2.2, arranged coaxially to the motor axis M of the rotor, is arranged on each end face of the electric motor housing 2.1. The bearing journals 2.2.1, 2.2.2 each protrude axially outwardly through the corresponding end shield 2.1.1, 2.1.2.

For supplying electrical energy to the electric motor 2, the latter is provided with an electrical connection 2.3. The electrical connection 2.3 is here configured as a plug which is connected, in particular latched, to an outer periphery of the electric motor housing 2.1. The electrical connection 2.3 may be connected to the on-board network of the vehicle in which the seat S is arranged, by means of specific connection components.

For arranging and fastening the electric motor 2 in the carrier element 1, the latter comprises two flanges 2.4 which are each provided with a passage opening. The electric motor 2 may be connected via the flanges 2.4 to connecting elements 1.1 which are arranged in a wall of the carrier element 1 delimiting a receiving opening 1.2. The connecting elements 1.1 are for example connecting pins which are guided through the passage openings of the flanges 2.4 and then secured.

Because of the flanges 2.4 which protrude radially outwardly from the end shield 2.1.2 of the end face of the electric motor housing 2.1, a diameter of the electric motor 2 is increased in this region so that corresponding dimensions of the receiving opening 1.2 in the carrier element 1 are required.

Furthermore, the installation position of the electric motor 2 in relation to its rotational position D relative to the carrier element 1 is fixedly defined, so that a position of the electrical connection 2.3 relative to the carrier element 1 is also fixedly defined.

For flexible use of an installation space for the electric motor 2 at least with regard to its rotational position D relative to the carrier element 1, a fastening arrangement B' is provided which is described in more detail below.

Figure 4:
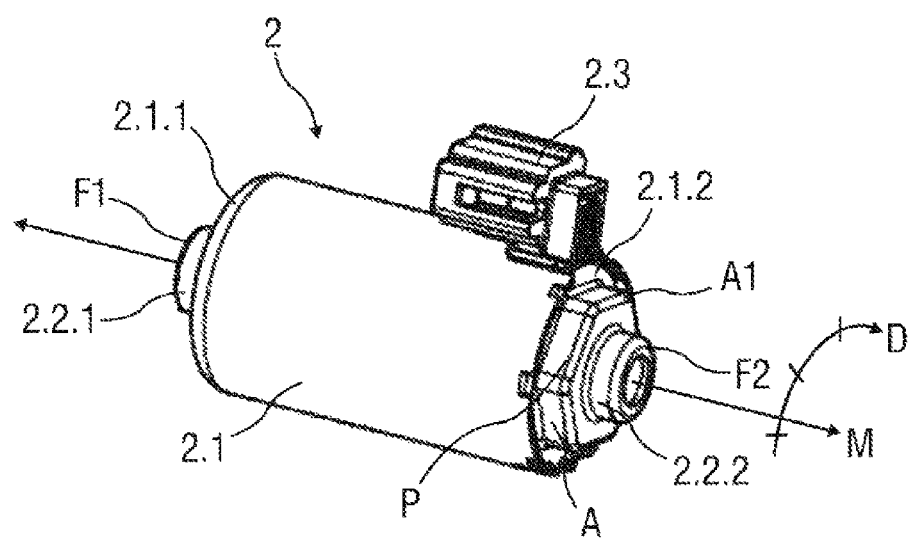
FIG. 4 is a diagrammatic perspective single view of an exemplary embodiment of an electric motor with a motor locking element having a polygonal profile.
Figure 5:
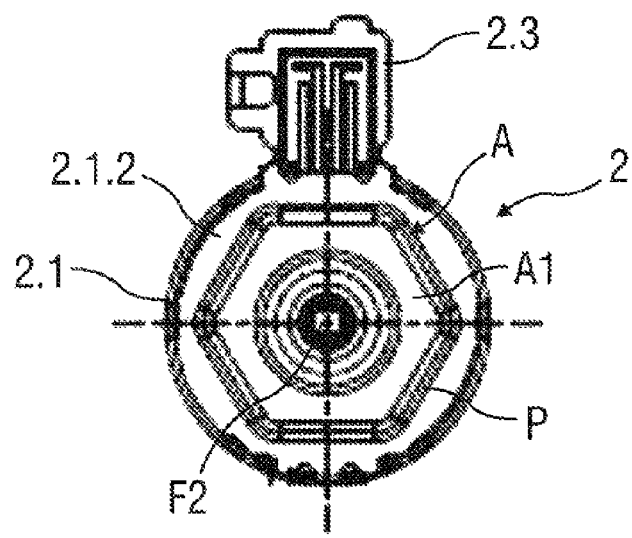
FIG. 5 is a diagrammatic front view of the electric motor with the polygonal profile.
Figure 6:
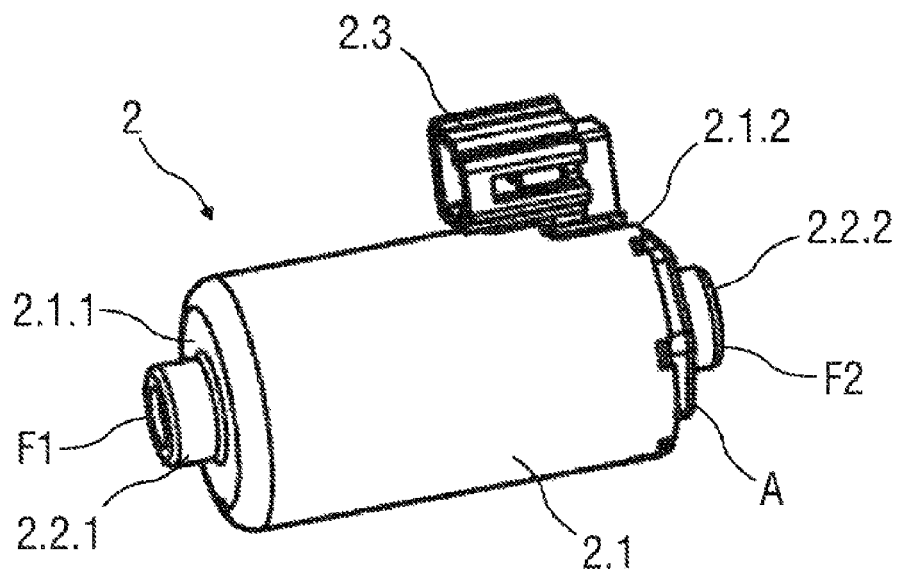
FIG. 6 is a diagrammatic further perspective single view of the electric motor.

For this, FIGS. 4 to 6 each show a single view of an exemplary embodiment of an electric motor 2.

The fastening arrangement B' comprises two motor fixing elements F1, F2 and a motor locking element A, which are arranged on the electric motor 2 and situated on different sectional planes through the motor axis M of the electric motor 2. The motor locking element A is formed integrally with the end shield 2.1.2 or is connected thereto. The motor locking element A is here formed as a protrusion A1 and has a polygonal profile P. According to the present exemplary embodiment, the polygonal profile P is formed as a hexagonal profile which protrudes axially outwardly from the end shield 2.1.2. Alternatively, the polygonal profile P may also be recessed radially inwardly and/or be formed as an octagonal or decagonal profile.

The motor fixing elements F1, F2 are formed by the bearing journals 2.2.1, 2.2.2 by means of which the electric motor 2 may be fastened to the carrier element 1 on both sides.

Figure 7:
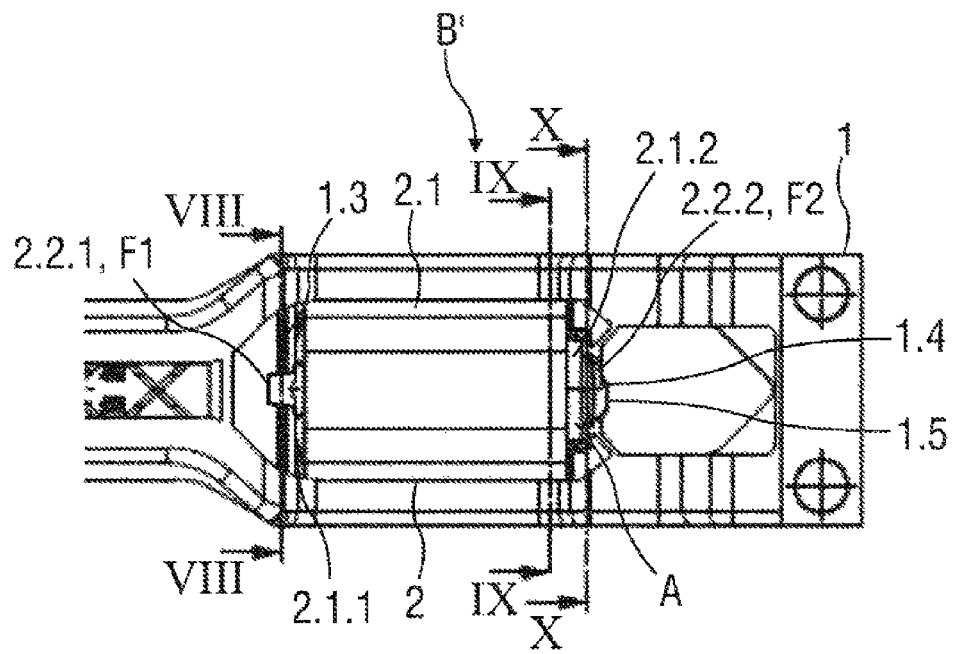
FIG. 7 is a diagrammatic top view of an extract with a carrier element and the electric motor in connected state.
Figure 8:
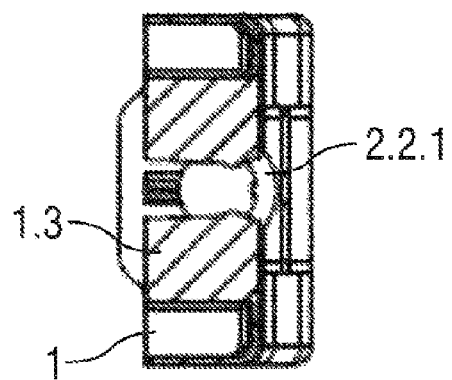
FIG. 8 is a diagrammatic sectional depiction of the extract according to FIG. 7.
Figure 9:
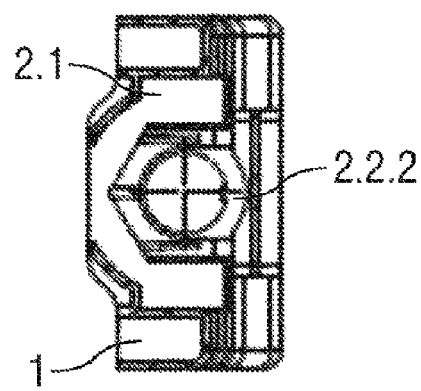
FIG. 9 is a diagrammatic sectional depiction of the extract according to FIG. 7.
Figure 10:
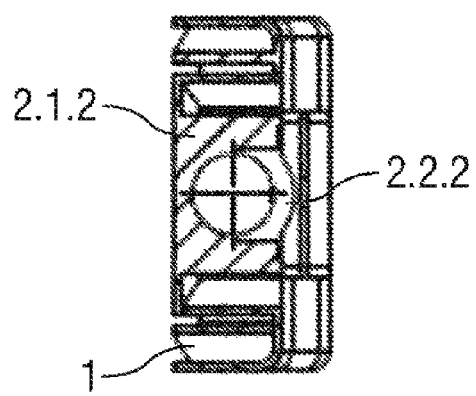
FIG. 10 is a diagrammatic sectional depiction of the extract according to FIG. 7.
Figure 11:
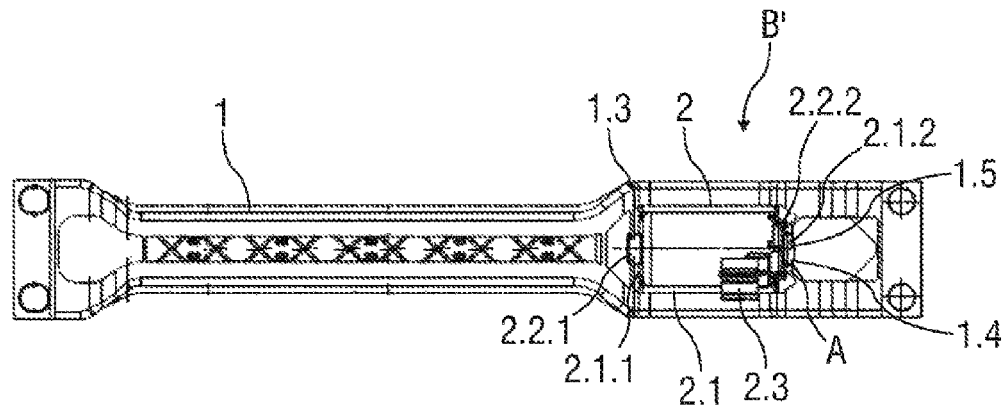
FIG. 11 is a diagrammatic sectional depiction of the carrier element and electric motor in connected state.

FIG. 7 shows a top view of an extract with the electric motor 2 according to the description from FIGS. 4 to 6 and with the carrier element 1, as an exemplary embodiment. FIGS. 8 to 10 shows sectional depictions, in particular cross-sections, through different planes of the extract shown in FIG. 7. FIG. 11 shows a complete view of the electric motor 2 and carrier element 1 in top view.

The electric motor 2 is arranged in the receiving opening 1.2 of the carrier element 1, wherein because of the absent flange 2.4 on the electric motor 2, the receiving opening 1.2 is formed with smaller dimensions than the receiving opening 1.2 shown in FIGS. 1 to 3.

By means of the motor fixing elements F1, F2, the electric motor 2 is connected to the carrier element 1 by friction and form fit. For this, the fastening arrangement B' comprises corresponding fixing components 1.3, 1.4 arranged on the carrier element 1, wherein one fixing component 1.3 has a clamp opening for receiving the bearing journal 2.2.1 by friction fit, and the other fixing component 1.4 is formed as an opening for receiving the other bearing journal 2.2.2 by form fit.

By means of the motor locking element A, the electric motor 2, in particular the electric motor housing 2.1, is locked in a specific rotational position D relative to the carrier element 1. The motor locking element A here cooperates with a corresponding locking component 1.5 which is shown as an example in FIG. 14. The locking component 1.5 has a polygonal profile 1.5.1 which corresponds to the polygonal profile P of the motor locking element A and is configured as a recess 1.5.1.1. Alternatively, the corresponding polygonal profile 1.5.1 may protrude outwardly, wherein the polygonal profile P of the motor locking element A then is then recessed inwardly. The locking component 1.5 may thus economically be formed as a counter-piece in the receiving opening 1.2, wherein no undercuts need be made in the carrier element 1 on production. The carrier element 1 may for example be produced by means of a simple injection-molding tool.

In mounted state of the electric motor 2, the motor locking element A and the locking component 1.5 thus form a precise form-fit connection, wherein several precise fit connections are possible. As a result, by means of the motor locking element A, several rotational positions D of the electrical connection 2.3 of the electric motor 2 relative to the carrier element 1 are possible, wherein a rotational step of the rotational position D of the electrical connection 2.3 in the installation position of the electric motor 2 amounts to a maximum of 60°. Preferably, a finer stepping of less than 60° is possible. In other words, in the concrete case of a hexagonal profile of the motor locking element A, the electric motor 2 and hence the electrical connection 2.3 may be arranged in six different rotational positions D relative to the carrier element 1, wherein the rotational positions D are each offset to each other at an angle of 60° relative to the motor axis M of the electric motor 2.

Because the motor locking element A forms a precisely fitting connection with the locking component 1.5, the motor locking element A serves in particular as a torque lock to compensate for a supporting moment of the electric motor 2 under so-called blocking travel. Blocking travel occurs here when the top rail 3 assigned to the electric motor 2 reaches a mechanical stop.

Figure 12:
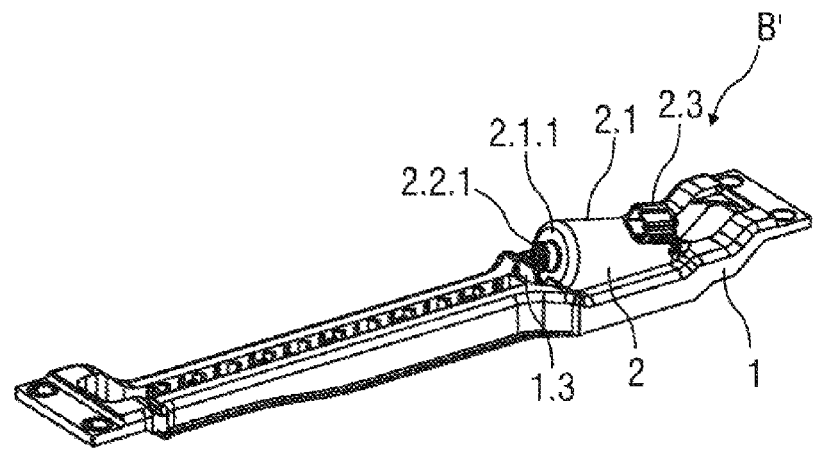
FIG. 12 is a diagrammatic perspective view of the carrier element and electric motor during installation.

To install the electric motor 2, in a first step this may be pre-mounted on the carrier element 1 by means of the motor fixing element F2, wherein the bearing journal 2.2.2 is arranged by form fit in the fixing component 1.4. Before pre-mounting of the electric motor 2, a desired rotational position D of the electric motor relative to the carrier element 1 is selected, and the electric motor 2 with the motor locking element A is then arranged accordingly in the locking component 1.5. When the motor locking element A is arranged in the locking component 1.5, at the same time the motor fixing element F2 is arranged in the fixing component 1.4. FIG. 12 shows this first step in a perspective depiction.

Figure 13:
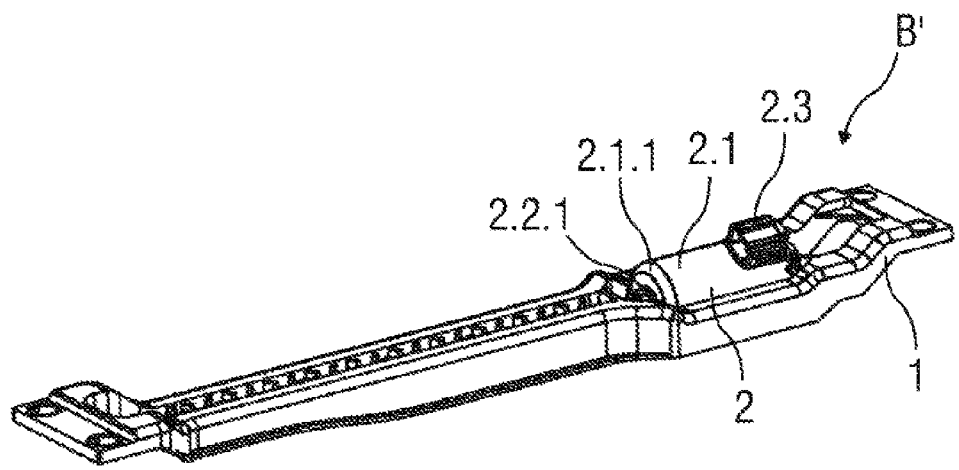
FIG. 13 is a diagrammatic perspective view of the carrier element and electric motor after installation.

In a second step, shown in perspective in FIG. 13, a definitive fixing of the electric motor 2 takes place, wherein the bearing journal 2.2.1 is pressed into the clamping opening of the fixing component 1.3 so that the motor fixing element F1 and the fixing component 1.3 are connected together by friction fit.

Figure 14:
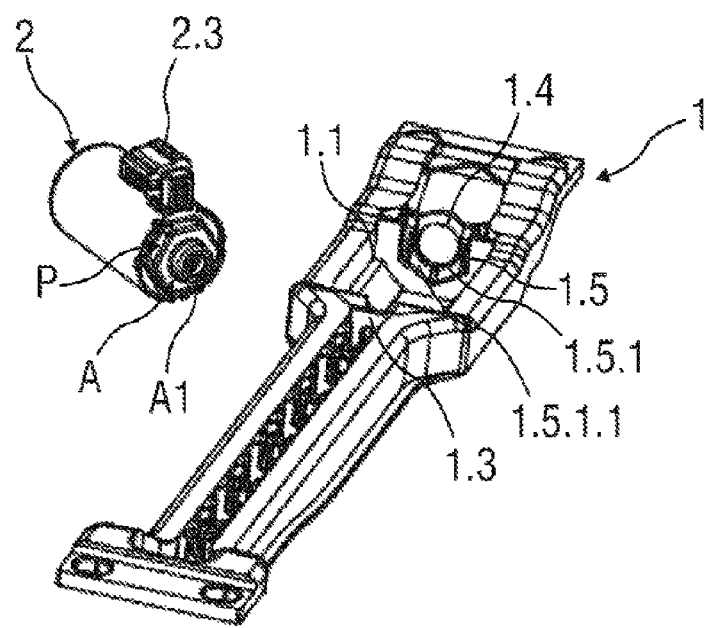
FIG. 14 is a diagrammatic perspective view of an extract with the carrier element and electric motor in unconnected state.

FIG. 14 shows in perspective an extract with the carrier element 1 and the electric motor 2 in the unconnected state, wherein the locking component 1.5 is shown in more detail.

FIG. 15 shows in perspective the length adjustment unit L with the carrier element 1, the electric motor 2 and two upper rails 3 of the seat S.

FIG. 16 shows a seat S with a length adjustment unit L in simplified depiction.

While specific embodiments of the invention have been shown and described in detail to illustrate the application of the principles of the invention, it will be understood that the invention may be embodied otherwise without departing from such principles.

The invention claimed is:

1. A fastening arrangement of an electric motor for fastening the electric motor to a seat (S), the fastening arrangement comprising:
    at least one motor fixing element; and
    at least one motor locking element, wherein:
    the at least one motor fixing element is configured such that the electric motor adjustable into a rotational position;
    the at least one motor locking element is configured such that the electric motor can be locked in a set rotational position;
    the motor locking element is configured such that the electric motor is fixed so as to be immovable in an axial direction and is secured against twisting by means of a torque lock;
    the at least one motor locking element has a polygonal profile;
    an outer profile of the motor locking element has multiple surfaces which are distributed uniformly over the periphery and form the shape of a polygon.

2. The fastening arrangement as claimed in claim 1, wherein the at least one motor fixing element and the motor locking element are arranged on an end face of the electric motor.

3. The fastening arrangement as claimed in claim 1, wherein the at least one motor fixing element and the motor locking element are arranged coaxially to each other.

4. The fastening arrangement as claimed in claim 1, wherein the motor locking element and the at least one motor fixing element are arranged so as to be axially offset to each other.

5. The fastening arrangement as claimed in claim 1, wherein the motor fixing element is configured such that the electric motor is fixed so as to be immovable in the axial direction and adjustable into one of several rotational positions.

6. The fastening arrangement as claimed in claim 1, wherein the at least one motor locking element is formed as a protrusion arranged on an end face of the electric motor and protrudes axially from an end shield of an electric motor housing.

7. The fastening arrangement as claimed in claim 1, further comprising another motor fixing element.

8. The fastening arrangement as claimed in claim 7, wherein the motor fixing elements are each formed by a bearing journal which protrudes radially outwardly and is guided through an end shield of an electric motor housing.

9. A seat comprising: a seat part; an electric motor and a fastening arrangement, the fastening arrangement comprising:
    at least one motor fixing element; and
    at least one motor locking element, wherein:
    the at least one motor fixing element is configured such that the electric motor adjustable into a rotational position;
    the at least one motor locking element is configured such that the electric motor can be locked in a set rotational position;
    the motor locking element is configured such that the electric motor is fixed so as to be immovable in an axial direction and is secured against twisting by means of a torque lock;
    an the outer profile of the motor locking element has multiple surfaces which are distributed uniformly over a periphery and forms a polygon shape, whereby the motor locking element has a polygonal profile.

10. The seat as claimed in claim 9, wherein the fastening arrangement further comprises:
    at least one fixing component corresponding to the motor fixing element; and
    at least one locking component corresponding to the motor locking element, wherein:
    the fixing component and the locking component are each arranged on the seat part; and
    by means of the at least one motor locking element and the at least one corresponding locking component, the electric motor can be arranged flexibly relative to the seat part with regard to a rotational position of the electric motor and can be locked in a set rotational position.

11. The seat as claimed in claim 9, wherein by means of the motor fixing element being arranged on an output side of the electric motor, the electric motor can be fixed to seat part via a form-fit or friction-fit connection.

12. The seat as claimed in claim 11, further comprising another motor fixing element, wherein the electric motor can also be fixed to the seat part via a form-fit connection by means of the another motor fixing element arranged on another output side of the electric motor.

13. The seat as claimed in claim 10, wherein the at least one fixing component and the at least one locking component are arranged on a carrier element of a length adjustment unit of the seat.

* * * * *